United States Patent [19]

Hoshino et al.

[11] Patent Number: 5,023,650
[45] Date of Patent: Jun. 11, 1991

[54] SILVER HALIDE FILM TYPE CAMERA

[75] Inventors: Yasushi Hoshino; Kazuhiro Sugiyama; Yoshitaka Ohta; Masaki Shimada, all of Tokyo, Japan

[73] Assignee: Konica Corporation, Tokyo, Japan

[21] Appl. No.: 416,661

[22] Filed: Oct. 3, 1989

[30] Foreign Application Priority Data

Oct. 11, 1988 [JP] Japan .................................. 63-253721

[51] Int. Cl.⁵ ............................................... G03B 7/08
[52] U.S. Cl. .................................... 354/441; 354/219; 354/75; 354/76
[58] Field of Search ..................... 354/219, 441, 75, 76

[56] References Cited

U.S. PATENT DOCUMENTS

| | | | |
|---|---|---|---|
| 3,883,883 | 5/1975 | Sano et al. | 354/75 |
| 4,303,322 | 12/1981 | Someya | 354/219 |
| 4,312,581 | 1/1982 | Miyagawa et al. | |
| 4,618,239 | 10/1986 | Sakamoto | 354/76 |
| 4,680,639 | 7/1987 | Isono et al. | |
| 4,682,240 | 7/1987 | Bachmann | |
| 4,692,006 | 9/1987 | Rice et al. | 354/219 |
| 4,704,022 | 11/1987 | Nozawa et al. | |
| 4,763,146 | 8/1988 | Nikura | 354/219 |

FOREIGN PATENT DOCUMENTS 842305 6/1952 Fed. Rep. of Germany .
1262770 3/1968 Fed. Rep. of Germany .

Primary Examiner—Russell E. Adams
Attorney, Agent, or Firm—Finnegan, Henderson, Farabow, Garrett, and Dunner

[57] ABSTRACT

A silver halide type camera wherein an optical image of a subject focused on a silver halide film is received by a charge coupled device, an image information from the charge coupled device is processed by a signal processing device and displayed on a display, and a photographing condition is changed according to the image on the display immediately before taking a picture to form an optimum picture on the silver halide film. The camera has a photographing condition input device, an operating device for generating a start signal for reproducing and displaying the image, a memory device for storing the image information signal, an image information transfer device for transferring to the memory device the image information signal which is generated within a predetermined time by the signal processing device, and a control device for actuating the image information transfer device on the basis of the photographing condition applied from the photographing condition input device when the start signal is generated by the operating device.

5 Claims, 6 Drawing Sheets

SILVER HALIDE FILM TYPE CAMERA

BACKGROUND OF THE INVENTION

1. Field of the Invention

This invention relates to an improvement in the silver halide film type camera.

2. Description of the Prior Art

In the silver halide film type camera, a picture is taken by watching a subject through an optical finder and operating the shutter to form an optical image of the subject on the silver halide film. The conventional silver halide film type camera, however, has the following drawback. That is, since the picture is taken by watching through the optical finder, when the subject to be photographed is placed against the light a difference occurs between the image of the object as seen through the finder and the actual image photographed on the silver halide film. Because of this difference, the photograph taken may not be what the photographer has expected it to be.

SUMMARY OF THE INVENTION

This invention has been accomplished with a view to overcoming the above drawback. An object of the invention is to provide a silver halide film type camera that enables the photographer to take a picture according to his or her needs.

The silver halide film type camera according to this invention comprises: a charge coupled device into which an optical image of a subject focused on a silver halide film is entered; a signal processing means to process image information from the charge coupled device; a display means to reproduce an image on a display from the processed image information; and a manipulation means to change a photographing condition; whereby the photographing condition can be changed according to the image on the display immediately before taking a picture, thereby forming an optimum picture on the silver halide film.

A camera according to the invention comprises a signal processing means for converting an optical image of a subject applied to a charge coupled device into an image information signal, a display means for reproducing and displaying the image information signal as an image, a photographing condition input means, an operating means for generating a start signal for reproducing and displaying the image, a memory means for storing the image information signal, an image information transfer means for transferring to the memory means the image information signal which is generated within a predetermined time by the signal processing means, and a control means for actuating the image information transfer means on the basis of the photographing condition applied from the photographing condition input means when the start signal is generated by the operating means.

Other objects and features of this invention will become apparent from the following description taken in conjunction with the attached drawings.

DESCRIPTION OF THE PREFERRED EMBODIMENTS

One embodiment of this invention will be described by referring to FIGS. 1 through 6.

Figure 1:
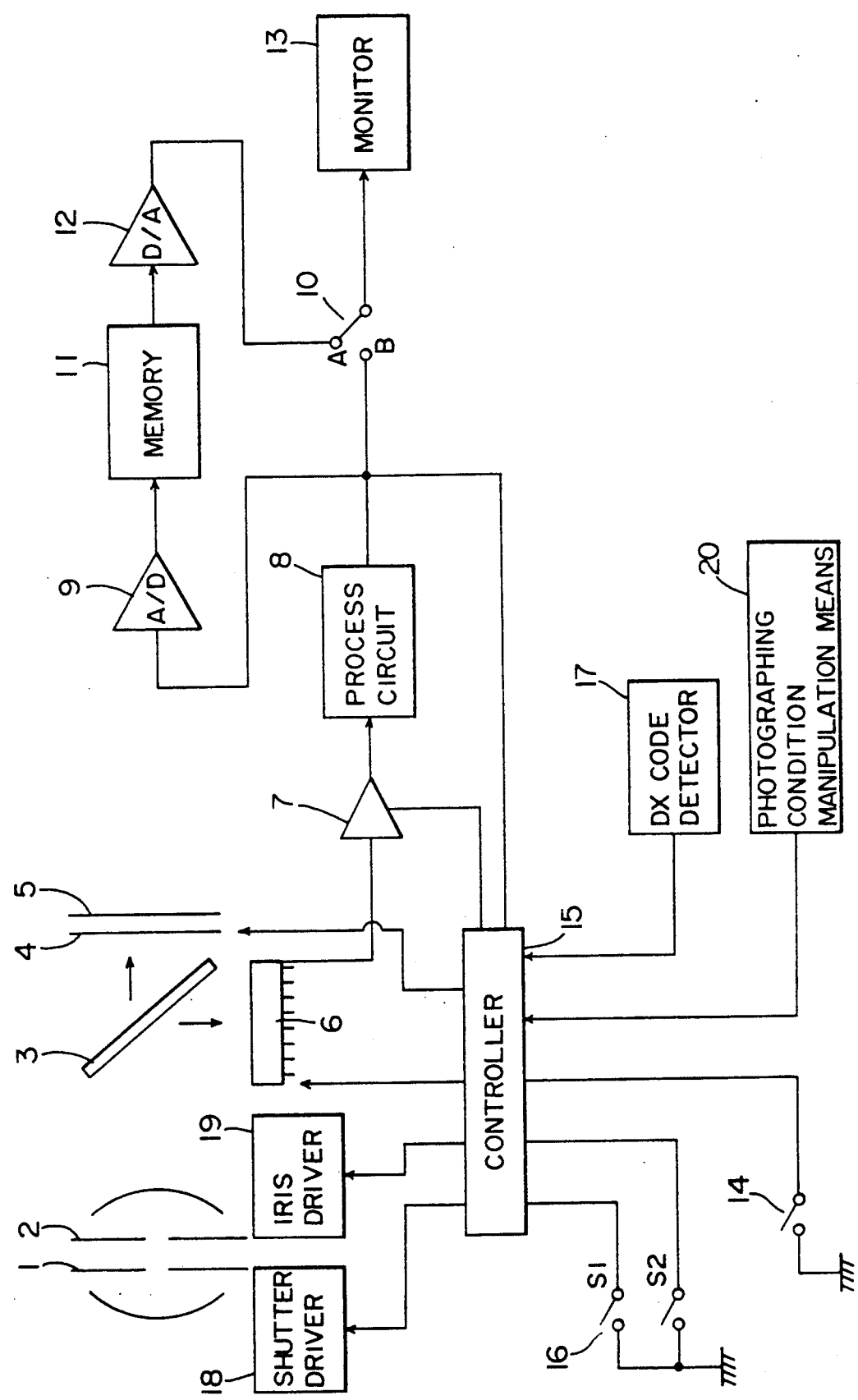
FIG. 1 is a schematic diagram showing the configuration of one embodiment of this invention.

In FIG. 1, an optical image of a subject entering from an optical lens (not shown) passes through a shutter 1 and an iris 2 to a half-mirror 3, from which it further passes through a light interrupting plate 4 to be focused on a silver halide film 5 and also on a CCD (charge coupled device) 6. The CCD 6 performs a photoelectric conversion on the optical image focused thereon to produce analog image signals, which are sent through an amplifier 7 to a process circuit 8 that processes the signals.

The process circuit 8 separates the analog image signal into a brightness signal including a synchronization signal and a chromatic signal. These separated signals are fed to an A/D converter 9 and also to a B input terminal of a selector switch 10. The A/D converter 9 performs A/D conversion on the signals from the process circuit 8 and sends the digital signal to a memory 11. The memory 11 temporarily stores the digital image data and then outputs it to a D/A converter 12. The D/A converter 12 performs D/A conversion on the digital image data and outputs the analog signal to an A input terminal of the selector switch 10, which outputs the image information to a monitor 13 as a display means. The operation of the selector switch 10 is controlled by a signal outputted from a controller 15 so that the image on the monitor 13 is switched over between a dynamic image mode and a stationary image mode so as to check effectively the image in case that the exposure condition such as a shutter second or iris opening is varied as described later on, or after taking a picture. The selector switch 10 can also be controlled by an input signal from a manual switch 14 in order to switch over the mode between the stationary image mode and the dynamic image mode and to display on the monitor 13 an image corresponding to the mode selected.

What are sent to the controller 15 include signals from S1 and S2 of a release switch 16 and a detection signal from a DX code detector 17 representing the number of silver halide film frames and the sensitivity of the film. Upon receiving these signals, the controller 15 outputs corresponding control signals.

A shutter driver 18 opens and closes the shutter 1 according to a signal from the controller 15. An iris driver 19 controls the opening of the iris 2 according to a signal from the controller 15.

An image reproducing start signal is generated and an image is displayed on the monitor 13 in order to check the image under the photographing conditions changed previously not only in the case that S1 of the release switch 16 is turned on, but also in the case that the manual switch 14 is operated.

It is easy to check the image, if the manual switch 14 is of the type that the operating positions can be latched, because even if the hand is detached from the switch the mode of the monitor 13 can be maintained.

Figure 2:
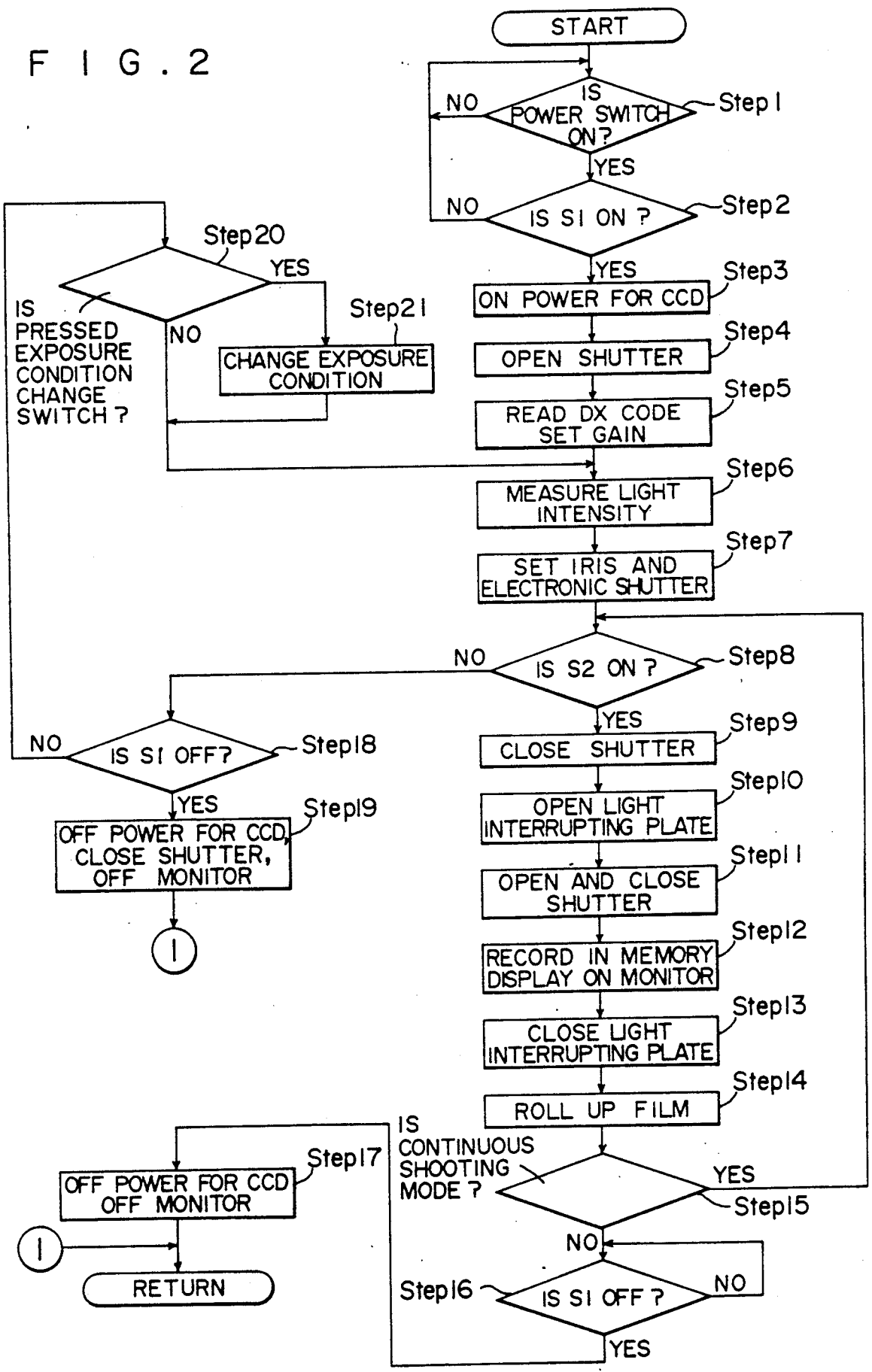
FIG. 2 is a flowchart of the embodiment.

Now, the operation of the camera with the above construction will be described by referring to a flowchart of FIG. 2.

At Step 1, it is decided whether the power switch of the camera is turned on. If so, the control sequence goes to Step 2. If not, it returns to Step 1. At this time the selector switch 10 is switched to the B input terminal by the operation of the manual switch 14. Also, the monitor 13 is turned on, ready to display an image.

At Step 2, it is checked if S1 of the release switch 16 is turned on. If so, the control sequence goes to Step 3. If not, it returns to Step 1.

Step 3 turns on the power for the CCD 6, after which the control sequence proceeds to Step 4.

Step 4 opens the shutter 1 and proceeds to Step 5.

Step 5 applies to an exposure condition operating portion provided in the controller 15 an iris information and a shutter second information set by the exposure condition from a photographing condition manipulation means 20 for varying the photographing condition when the manual setting mode of the exposure condition is selected by the photographing condition manipulation means 20, and reads the sensitivity of the silver halide film and the number of film frames, both detected by the DX code detector 17. At Step 5, the gain of the amplifier 7 of CCD 6 is set according to the sensitivity of the silver halide film so as to make the sensitivities of the silver halide film and the photographing section of CCD 6 equal. If the gain adjustment on the amplifier 7 fails to make equal these sensitivities, an alarm is issued to, say, the monitor 13.

Next, at Step 6 the light intensity is measured and the iris opening and the shutter speed are determined by operating a suitable exposure in the controller 15 according to the measured light intensity with the iris information and the shutter second information in case of the manual setting mode, or with the preset exposure condition in the exposure program etc. in case of the auto mode.

At Step 7, the iris 2 is driven to set its opening to a specified value and the electronic shutter speed of CCD 6 is also set. For example, when the iris is at F4 setting and the shutter speed is at 1/125 setting, the iris is actually set to F4 and the electronic shutter speed of CCD is set to 1/125. If the sensitivity of the silver halide film is too high to be made compatible with that of CCD 6, the following actions are taken. That is, when for example the sensitivity of CCD 6 is 1 EV lower than that of the silver halide film, the iris is set to F4 and the shutter speed is set to 1/60; or the iris is set to F2.8 and the shutter speed is set to 1/125. At the same time, an alarm is issued as mentioned above.

Figure 3:
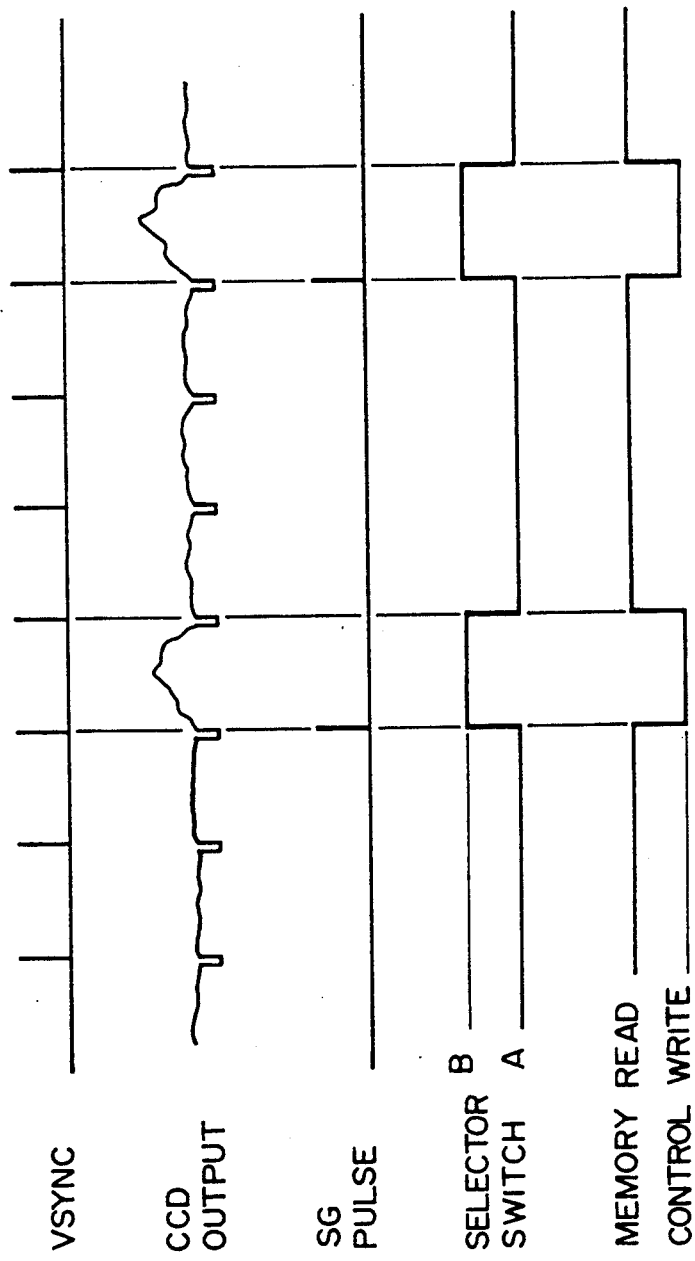
FIGS. 3 through 6 are drawings showing the operation of the embodiment.

When one wishes to set the electronic shutter speed of CCD 6 at, say, 1/15, an SG pulse that causes an electric charge as image information to be transferred from the charge accumulator section to the transfer section in CCD 6 is output every four vertical synchronizing signals Vsync, as shown in FIG. 3. The vertical synchronizing signal is produced at the rate of 1/60 seconds. During the period over four vertical synchronizing signal cycles, the charge (image information) accumulated in CCD 6 is read out and therefore the electronic shutter speed can be set to 1/15. The image information thus read out is stored in memory 11 in synchronism with the SG pulse. While the image information is being stored, the image information in CCD 6 is directly displayed on the monitor 13 through the selector switch 10. Except during the storing period, the data stored in the memory 11 is output through the selector switch 10 to the monitor 13 for display.

Under these conditions, CCD 6 is driven to display a dynamic image on the monitor 13 which is almost the same as the optical image of the subject focused on the silver halide film 5. The photographer watches the image on the monitor 13 to check the effect of the selected iris opening on the silver halide film 5 before taking a picture. The effect of the shutter speed is also checked by a method described later on. According to these checks the photographer makes adjustment on the iris opening and the shutter speed by the adjust wheel (not shown) so that the best image can be obtained.

Then, the camera waits for the release switch to be turned on.

Further, in case that a monitor button (not shown) is provided, only the operations at the steps 1 to 7 can be carried out irrespective of the photographing, or the exposure condition can be prepared prior to the photographing.

Step 8 checks whether S2 of the release switch is turned on or not. If S2 is found to be turned on, the control sequence goes to Step 9. If not, it proceeds to Step 18. During the period after S1 has been turned on until S2 is turned on, an automatic focusing control is performed in addition to the above-mentioned operations. The automatic focusing control is not explained here.

At Step 9, the shutter 1 is closed and, at Step 10, the light interrupting plate 4 is opened.

At Step 11, the shutter 1 is opened and closed according to the shutter speed that was previously set, to expose the silver halide film 5 with the image of the subject focused thereon. At this time, the electronic shutter operation of CCD 6 is not performed and the reading of CCD 6 is stopped for a period longer than at least the exposure time of the silver halide film. Reading of CCD 6 is started immediately after the shutter 1 is closed.

At step 12, the image information read out from CCD 6 is recorded in memory 11 and then the selector switch 10 is switched to the A input terminal to display the image information stored in memory 11 on the monitor 13 as a stationary image. From the stationary image it is possible to check again the condition of a photograph taken on the silver halide film 5.

Then, Step 13 closes the light interrupting plate 4; and Step 14 rolls up one frame of the silver halide film 5, before proceeding to Step 15.

At Step 15, it is checked whether the selection mode is in the continuous shooting mode. If so, the control sequence returns to Step 8, performing the controls of Steps 8 through 14. If not, it goes to Step 16. It is noted that the closing of the light interrupting plate 4 at Step 13 and the winding up of the silver halide film 5 at Step 14 may be reversed in order. When it is easier to feed the silver halide film with the light interrupting plate 4 open, the sequence of these steps in FIG. 2 may preferably be reversed.

At Step 16, it is checked if S1 of the release switch is off. If so, the control sequence proceeds to Step 17. If not, it returns to Step 16 and waits for S1 to be turned off. To save electric energy, a routine may be included between Step 15 and Step 16 to turn off power for CCD 6.

Step 17 turns off power for CCD 6 and also power for the monitor 13, before terminating the routine.

When at Step 8, S2 of the release switch is found to be off, Step 18 checks if S1 of the release switch is off. If so, the control sequence proceeds to Step 19. If not, it goes to Step 20.

Step 19 turns off power for CCD 6 and closes the shutter 1 before terminating its routine.

At Step 20, it is checked whether the exposure condition change switch in an exposure condition input means for applying an iris opening or shutter second information in said manual setting mode is pressed or not. When the switch is found to be pressed, the control sequence goes to Step 21. If not, it goes to Step 6. Step 21 changes the exposure condition before proceeding to Step 6.

The effect of the selected iris opening can be checked by actually setting the iris to the desired value and watching the dynamic image displayed on the monitor 13. The effect of the selected shutter speed, however, is difficult to check with the dynamic image. Therefore, the following trial picture is taken to confirm the effect of the shutter speed.

Figure 4:
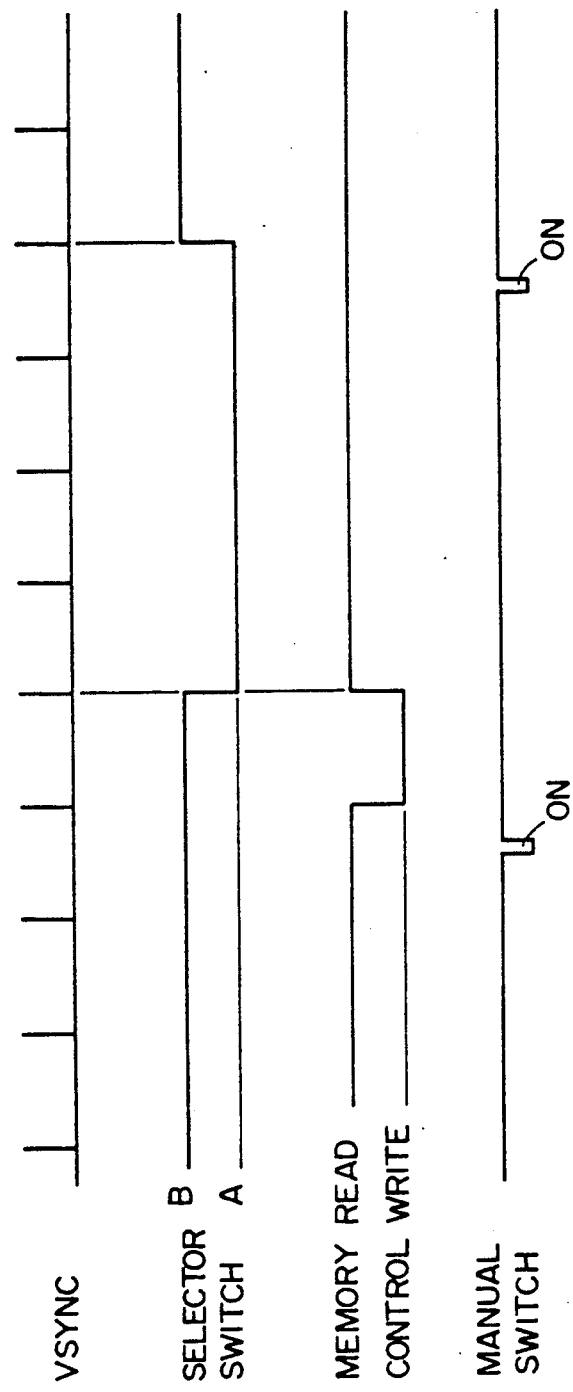

For example, while S1 of the release switch is on, the manual switch 14 is turned on as shown in FIG. 4 to store the image at that instant in memory 11. Then, the selector switch 10 is switched to the A input terminal to display the image from the memory 11 on the monitor 13 as a stationary image. From the stationary image, the effect of the shutter speed can be checked.

Figure 5:
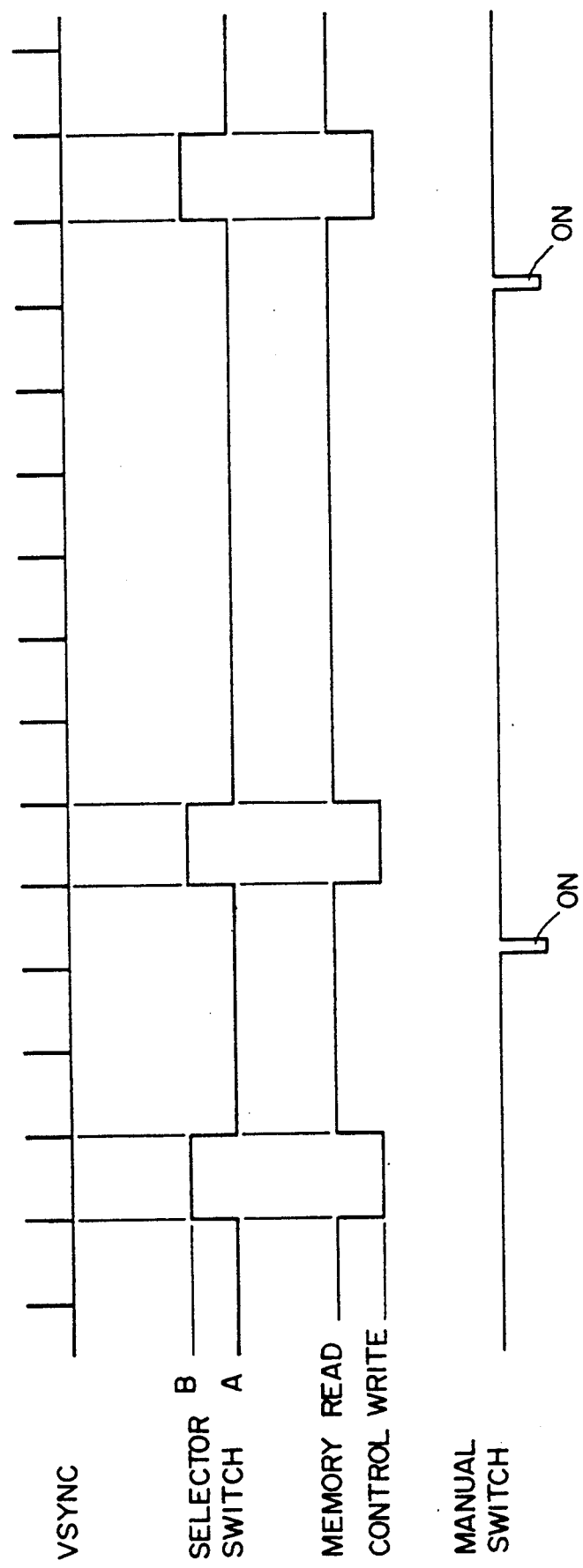

When the shutter speed is slow (say, 1/15 or 1/8), the memory is being written almost at all times. Therefore, in taking a trial picture the manual switch 14 is turned on to prohibit the writing into memory 11 as shown in FIG. 5 and then the image information stored in the memory 11 is displayed on the monitor 13 as the stationary image, thus allowing the photographer to check the effect of the selected shutter speed. When one wants to terminate this operation, one needs to turn the manual switch 14 on again to allow the writing into memory 11.

When the sensitivity of the photographing section of CCD 6 is lower than that of the silver halide film 5, the effect of the selected iris opening can be checked from the dynamic image on the monitor 13, as with the previous case. A check on the effect of the selected shutter speed is made as follows.

Figure 6:
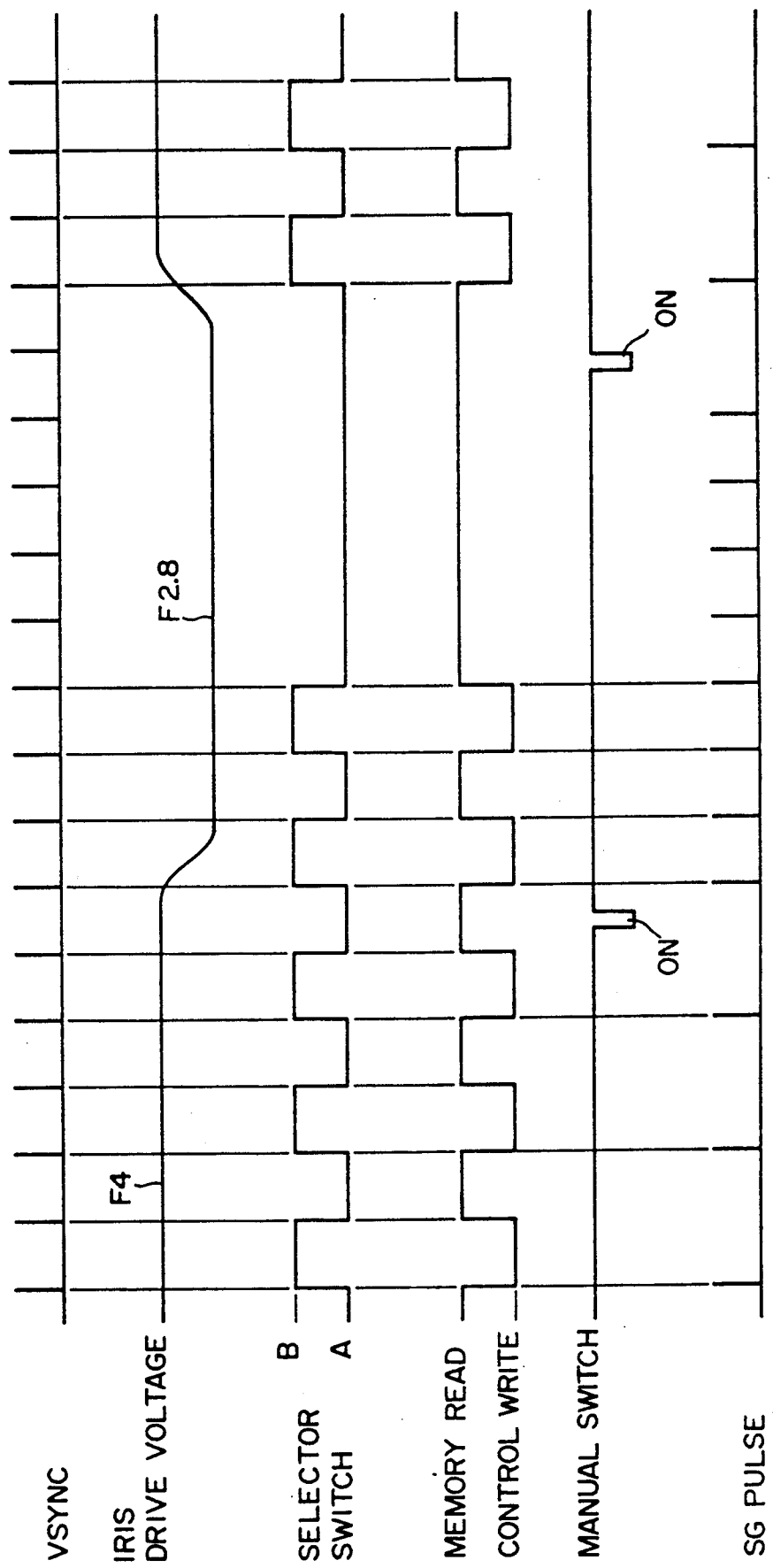

Suppose one wants to expose the silver halide film 5 with the iris opening at F4 and the shutter speed at 1/60. When the photographing section of CCD 6 has an optimum exposure at the iris of F4 and the shutter speed of 1/30, or at the iris of F2.8 and the shutter speed of 1/60, the iris of the photographing section of CCD 6 is set to F4 and the shutter speed to 1/30, as shown in FIG. 6, to display a dynamic picture on the monitor 13 so that the photographer can check the effect of the selected iris opening. When checking the shutter speed, the manual switch 14 is turned on to control the iris 2 at F2.8. With the iris of the photographing section of CCD 6 set at F2.8 and the shutter speed at 1/60, a trial picture is taken to display the static picture from the memory 11 on the monitor 13, as shown in FIG. 6.

As explained above, the image information from CCD 6 is displayed on the monitor 13 immediately before taking a picture. According to this image, one can adjust the photographing conditions such as iris and shutter speed settings until the image on the monitor 13 almost equal to the image on the silver halide film 5 is a desired one. This in turn allows an optimum picture to be formed on the silver halide film 5 even when taking a picture against the light. Also, immediately after shooting, the image almost equal to the one on the silver halide film 5 is read out from the memory 11 and displayed on the monitor 13. This permits the photographer to instantly see how the photograph taken on the silver halide film 5 looks like from the image on the monitor 13, allowing him, if necessary, to take a corrective shot again. Accordingly, an optimum picture can be obtained even in the case that the suitable shooting might not be carried out under the exposure condition set immediately before the shooting, because the condition of the subject is varied suddenly, for example.

A transparent touch panel may be mounted on the display of the monitor 13 and an operation means such as iris and shutter speed changing means may be arranged on the touch panel as an exposure condition input means.

ADVANTAGES OF THE INVENTION

Since in the silver halide film type camera according to this invention, the image information from the charge coupled device is displayed on the display means so that the photographer can change the photographing conditions according to the displayed image, it is possible to obtain an optimum image on the silver halide film according to the needs of the photographer even during backlighting.

What is claimed is:

1. A camera for taking a picture of an object on silver halide film, comprising:
    means for converting an optical image of the object into an image information signal corresponding to the optical image, the converting means including a photographing section for receiving the optical image;
    memory means for storing the image information signal to reproduce a visible still image of the optical image;
    means for displaying the visible still image;
    means for setting photographic conditions depending upon the visible still image displayed on the display means;
    means for switching the operation of the camera between a first mode and a second mode, wherein when the camera is operated in the first mode the photographic conditions can be adjusted to obtain a desirable photographing condition and in the second mode the picture is taken based upon the photographic conditions set in the first mode;
    means for detecting a sensitivity of the silver halide film; and
    means for adjusting the photographing section of the converting means in response to the sensitivity of the film detected by the detecting means, so that the visible image displayed by the display means is substantially equivalent to the object being photographed.

2. The camera of claim 1, further comprising an optical system including an iris diaphragm and shutter means for converting an image of the object into the optical image.

3. The camera of claim 2, wherein one of the photographic conditions is a value representing an opening amount of the iris diaphragm.

4. The camera of claim 2, wherein one of the photographic conditions is a shutter speed of the shutter means of the optical system.

5. The camera of claim 1, further comprising means for either selecting a dynamic image mode or a stationary image mode, wherein during the dynamic image mode a dynamic image is displayed by the display means in accordance with the image information signal supplied by the converting means, and during the stationary image mode a still image is displayed by the display means in accordance with the image information signal stored in the memory means to adjust the photographing conditions.

* * * * *